(12) United States Patent
Tseng et al.

(10) Patent No.: US 9,971,606 B2
(45) Date of Patent: May 15, 2018

(54) TECHNIQUE FOR REORDERING HARD DRIVE ACTIVATION REPORTS TO ACHIEVE SEQUENTIAL HARD DRIVE ORDERING

(71) Applicant: Super Micro Computer, Inc., San Jose, CA (US)

(72) Inventors: Kelvin Tseng, San Jose, CA (US); Trina Shih, San Francisco, CA (US); Lawrence H. Liang, San Jose, CA (US); Richard Chen, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 39 days.

(21) Appl. No.: 15/132,162

(22) Filed: Apr. 18, 2016

(65) Prior Publication Data
US 2017/0300339 A1    Oct. 19, 2017

(51) Int. Cl.
G06F 9/44    (2006.01)

(52) U.S. Cl.
CPC .......... *G06F 9/4403* (2013.01); *G06F 9/4406* (2013.01)

(58) Field of Classification Search
None
See application file for complete search history.

(56) References Cited

U.S. PATENT DOCUMENTS

| | | | | | |
|---|---|---|---|---|---|
| 5,423,046 | A * | 6/1995 | Nunnelley | ............... | G06F 1/206 711/114 |
| 6,748,510 | B1 * | 6/2004 | Coatney | .............. | G06F 11/0727 710/8 |
| 7,278,067 | B1 * | 10/2007 | Coatney | .............. | G06F 11/1076 714/54 |
| 2001/0048566 | A1 * | 12/2001 | Hirano | ................... | G11B 21/12 360/48 |
| 2003/0023784 | A1 * | 1/2003 | Matsunami | ........... | G06F 3/0607 710/36 |
| 2004/0117522 | A1 * | 6/2004 | Loffink | ................ | G06F 3/0607 710/74 |
| 2005/0204207 | A1 * | 9/2005 | Arai | ..................... | G06F 11/1092 714/54 |
| 2007/0094472 | A1 * | 4/2007 | Marks | .................. | G06F 3/0607 711/170 |
| 2009/0077416 | A1 * | 3/2009 | D'Souza | ............. | G06F 11/1076 714/6.12 |
| 2010/0057991 | A1 * | 3/2010 | Yoshida | ................ | G06F 1/3221 711/114 |
| 2015/0006818 | A1 * | 1/2015 | Kobashi | ................ | G06F 3/0617 711/114 |
| 2015/0362972 | A1 * | 12/2015 | Frick | ..................... | G06F 1/3203 713/320 |

* cited by examiner

*Primary Examiner* — Midys Rojas
*Assistant Examiner* — Khoa D Doan
(74) *Attorney, Agent, or Firm* — Artegis Law Group, LLP

(57) ABSTRACT

A storage enclosure includes a plurality of hard drives coupled to a logic device that, in turn communicates with an operating system (OS) executing on a host computer system. When the storage enclosure is powered on, the hard drives become active at different times and transmit activation reports to the logic device in a random order. The logic device receives these activation reports, and then reorders then to align with the bay numbers where the hard drives are mounted. The logic device then transmits the reordered activation reports, and the OS assigns logical IDs to the hard drives that match the bay numbers.

20 Claims, 4 Drawing Sheets

TECHNIQUE FOR REORDERING HARD DRIVE ACTIVATION REPORTS TO ACHIEVE SEQUENTIAL HARD DRIVE ORDERING

BACKGROUND OF THE INVENTION

Field of the Invention

Embodiments of the present invention relate generally to storage enclosures, and, more specifically, to a technique for reordering hard drive activation reports to achieve sequential hard drive ordering.

Description of the Related Art

A conventional storage enclosure typically includes numerous hard drives. Each hard drive is coupled to a logic device that, in turn, is coupled to a host computer system. The host computer system executes an operating system (OS) that is configured to communicate with the logic device to perform memory access operations with respect to the hard drives. Each hard drive is usually assigned a unique hard drive identifier (ID). The OS may rely on these hard drive IDs to distinguish between the different hard drives when communicating with the storage enclosure.

Within a typical storage enclosure, the various hard drives are mounted in different bays. Each bay is associated with a different, sequential bay number, typically starting at zero. The hard drive ID for a given hard drive is generally unrelated to the bay number of the bay where that hard drive is mounted.

When the storage enclosure is first powered on, each hard drive transmits an activation report to the logic device. The activation report for a given hard drive includes the hard drive ID associated with the hard drive. The logic device relays each received activation report to the OS in the order of receipt. When the OS receives an activation report, the OS assigns a logical ID to the hard drive identified by the received activation report. Typically, the OS assigns sequential logical IDs to the hard drives in the order with which the corresponding activation reports are received. However, the hard drives may become active at different, randomly distributed times, which can result in those hard drives transmitting activation reports at different, randomly distributed times. Consequently, the OS usually assigns logical IDs to the different hard drives in an order that in no way corresponds to the physical ordering of those drives within the storage enclosure.

Problems arise from the above approach because there is no association between the logical ID assigned to a given hard drive and the bay number of the bay in which the hard drive is mounted. In particular, there is no way for the OS to indicate where a given hard drive resides based only on the logical ID assigned to that hard drive. Consequently, if the OS detects a problem with a particular hard drive, then the OS cannot indicate to an end-user where that hard drive is located within the storage enclosure. As a result, in the case where a specific hard drive needed to be replaced or repaired, a technician would need to consult the OS to determine the hard drive ID of the afflicted hard drive and then manually check the hard drive IDs of each hard drive in the storage enclosure to find the matching hard drive ID. Only then could the technician repair or replace the hard drive. Such a process is time-consuming and error prone, especially with large storage enclosures that store many different hard drives.

As the foregoing illustrates, what is needed in the art is a more effective technique for locating hard drives within a storage enclosure.

SUMMARY OF THE INVENTION

Various embodiments of the present invention sets forth a storage enclosure, including a first hard drive configured to transmit a first activation report to an operating system upon activation and a second hard drive configured to transmit a second activation report to the operating system upon activation, and a logic device configured to receive the first activation report, receive the second activation report, and transmit the first activation report and the second activation report to the operating system according to a first ordering according to which activation reports are to be transmitted.

At least one advantage of the disclosed approach is that the operating system can indicate a particular hard drive using a specific logical ID, and that logical ID can then be used to quickly locate the hard drive within the corresponding bay. Thus, if a hard drive needs to be repaired or replaced, a technician can very quickly identify that hard drive based on data received from the OS.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
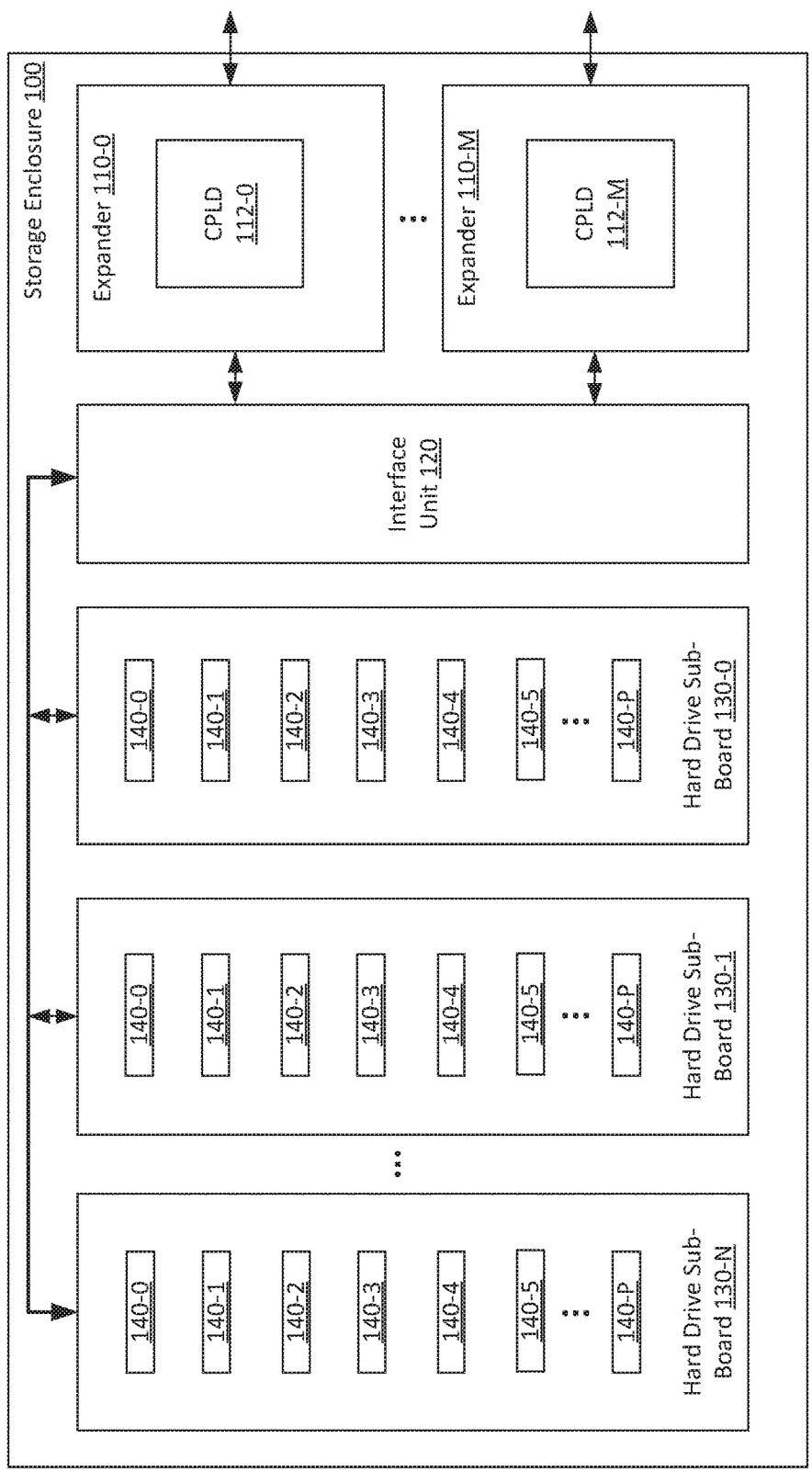
FIG. 1 is a block diagram of a storage enclosure, according to various embodiments of the present invention.

FIG. 1 is a block diagram of a storage enclosure, according to various embodiments of the present invention. As shown, storage enclosure 100 includes a plurality of expanders 110-0 through 110-M, an interface unit 120, and a plurality of hard drive sub-boards 130-0 through 130-N. Each expander 110 includes a complex logic device 112. Each hard drive sub-board includes a plurality of hard drives 140-140-P.

Storage enclosure 100 may include any number of expanders 110 and corresponding CPLDs 112, although in practice, storage enclosure 100 includes two expanders and two corresponding CPLDs 112. Similarly, storage enclosure 100 may include any number of hard drive sub-boards 130 and corresponding hard drives 140, although in practice, storage enclosure 100 typically includes three hard drive sub-boards 130, with 30 hard drives 140 per hard drive sub-board 130.

Expanders 110 are coupled to interface unit 120, and interface unit 120 is coupled to hard drive sub-boards 130. Expanders 110 are also coupled to a host computer system (not shown). CPLDs 112 within expanders 110 communicate with an operating system (OS) executing on the host computer system in order to provide that computer system with read/write access to hard drives 140.

When storage enclosure 100 is powered on, hard drives 140 become active at potentially different times. Each such hard drive 140, upon activation, transmits an activation report to CPLDs 112. The activation report identifies the particular hard drive that became active. CPLDs 112 then perform a reordering procedure to reorder the activation reports prior to transmission to the OS. In doing so, CPLDs 112 cause the activation reports to be transmitted to the OS in an order that corresponds to the ordering of the bay numbers where those hard drives 140 are mounted. With this approach, the OS may then assign a logical ID to each hard drive 140 that matches the bay number where that hard drive is mounted. This approach is described in greater detail below in conjunction with FIG. 2

Figure 2:
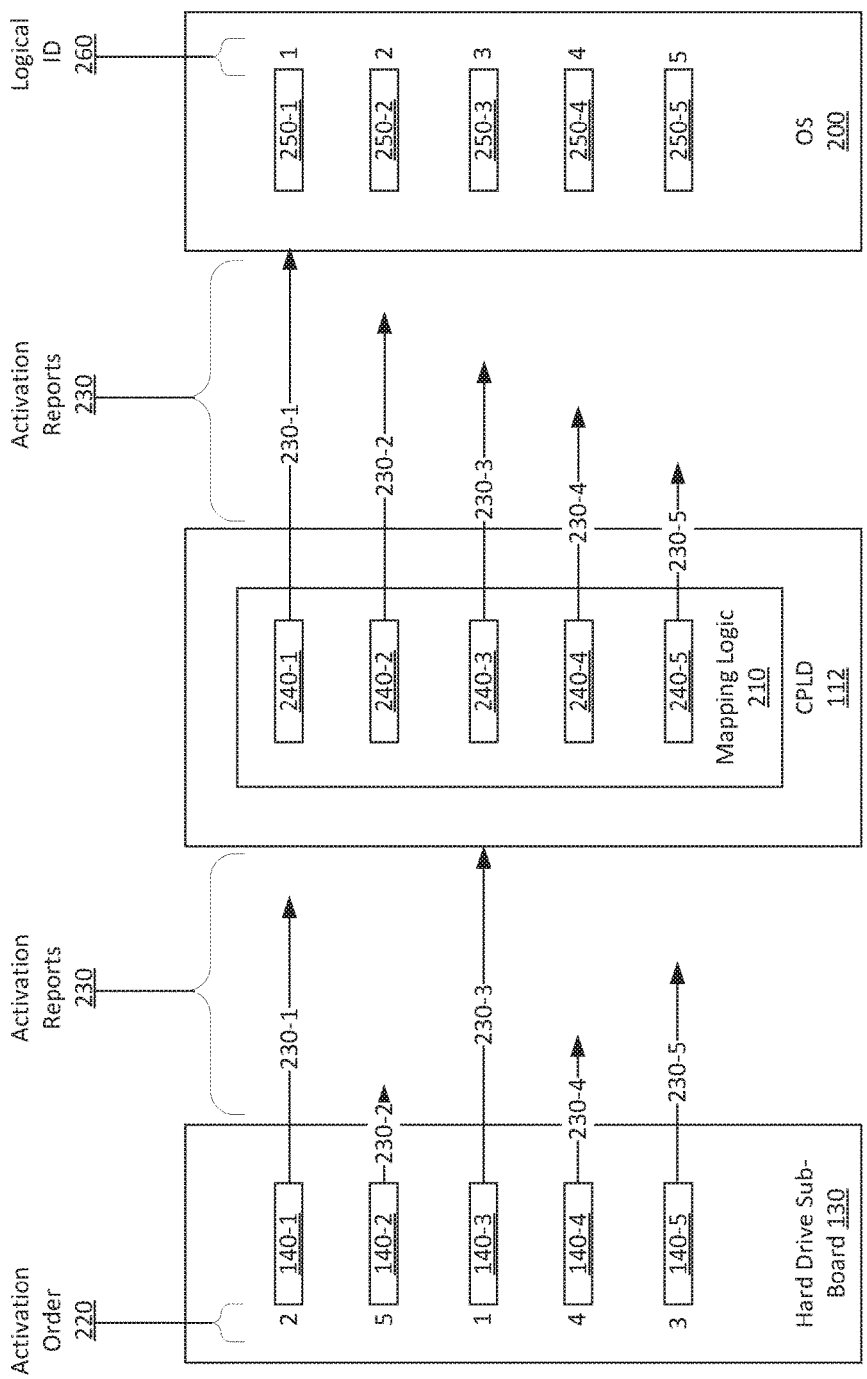
FIG. 2 is an conceptual illustration of how mapping logic within one of the complex logic devices (CPLDs) of FIG. 1 performs an exemplary reordering of activation reports, according to various embodiments of the present invention.

FIG. 2 is an exemplary illustration of how mapping logic within one of the complex logic devices (CPLDs) of FIG. 1 performs an exemplary reordering of activation reports, according to various embodiments of the present invention. As shown, hard drive sub-board 130 includes hard drives 140-1 through 140-5, which are mounted to various bays within hard drive sub-board 130 in the order shown. CPLD 112 includes mapping logic 210. Mapping logic 210 includes a different entry 240 for each hard drive 140. OS 200 includes a different entry 250 for each hard drive 140. Either one of, or both of CPLDs 112 may perform the techniques described herein.

As also shown, each hard drive 140 becomes active in activation order 220. Hard drive 140-3 becomes active first, hard drive 140-1 becomes active second, hard drive 140-5 becomes active third, hard drive 140-4 becomes active fourth, and hard drive 130-2 becomes active last. Upon activation, each hard drive 140 transmits an activation report 230 to CPLD 112. CPLD 112 receives activation reports 230 at different times based on activation order 220, as indicated by the arrow length associated with each activation report 230. CPLD 112 receives activation report 230-3 first. CPLD 112 receives activation report 230-1 second. CPLD 112 receives activation report 230-5 third. CPLD 112 receives activation report 230-4 fourth. CPLD 112 receives activation report 230-2 last.

When mapping logic 210 receives an activation report 230, mapping logic 210 stores the activation report 230 (or data reflective thereof) in the corresponding entry 240. For example, upon receiving activation report 230-1, mapping logic 210 stores activation report 230-1 in entry 240-1. When certain conditions are met, mapping logic 210 transmits any received activation reports 230 to OS 200. In one embodiment, mapping logic 210 waits for a specific "activation interval" before transmitting any received activation reports 230 to OS 200. The activation interval may reflect an estimated amount of time needed for all hard drives 140 to become active. In another embodiment, mapping logic 210 waits until all entries 240 have been populated with activation reports 230, and then transmits those activation reports to OS 200.

Mapping logic 210 is configured to transmit activation reports 230 to OS 200 in an order that is equivalent to the order of bays to which hard drives 140 are mounted. As mentioned above, hard drives 140 are mounted to bays in hard drive sub-board 130 in the order shown. Thus, mapping logic 210 transmits activation report 230-1, associated with hard drive 140-1 that is mounted to a first bay, first. Mapping logic 210 transmits activation report 230-2, associated with hard drive 140-2 that is mounted to a second bay, second. Mapping logic 210 transmits activation report 230-3, associated with hard drive 140-3 that is mounted to a third bay, third. Mapping logic 210 transmits activation report 230-4, associated with hard drive 140-4 that is mounted to a fourth bay, fourth. Mapping logic 210 transmits activation report 230-5, associated with hard drive 140-5 that is mounted to a fifth bay, fifth.

OS 200 receives activation reports 230, in the order discussed above, and populates corresponding entries 250 with those reports (or data reflective of those reports). OS 200 then assigns a logical ID 260 to the hard drive associated with each activation report. Since OS 200 receives activation reports 230 in an order that reflects the order with which hard drives 140 are mounted, OS 200 assigns logical IDs in that same order. The order of logical IDs 260 is therefore aligned with the order of the bays where hard drives 140 are mounted. Thus, only the logical ID 220 of a particular hard drive 140 is needed in order to physically locate that hard drive 140, since that logical ID is equivalent to the bay number for that hard drive.

This approach eases the burden on technicians who must physically locate hard drives 140 for repair, replacement, and so forth. The advantages of this approach are especially apparent in larger storage enclosures that support many hard drives. With conventional techniques, the technician would need to inspect some or all of the many hard drives in the enclosure before the hard drive in question is located. This may be very time consuming in a storage enclosure that supports 90 or more hard drives. However, the techniques described this far enable the technician to simply determine the logical ID of the impaired hard drive (e.g., via interaction with the OS 200), and then locate the bay having the same number. Since hard drive bays are typically sequentially disposed, locating a hard drive bay based on a logical ID is relatively simple.

Figure 3:
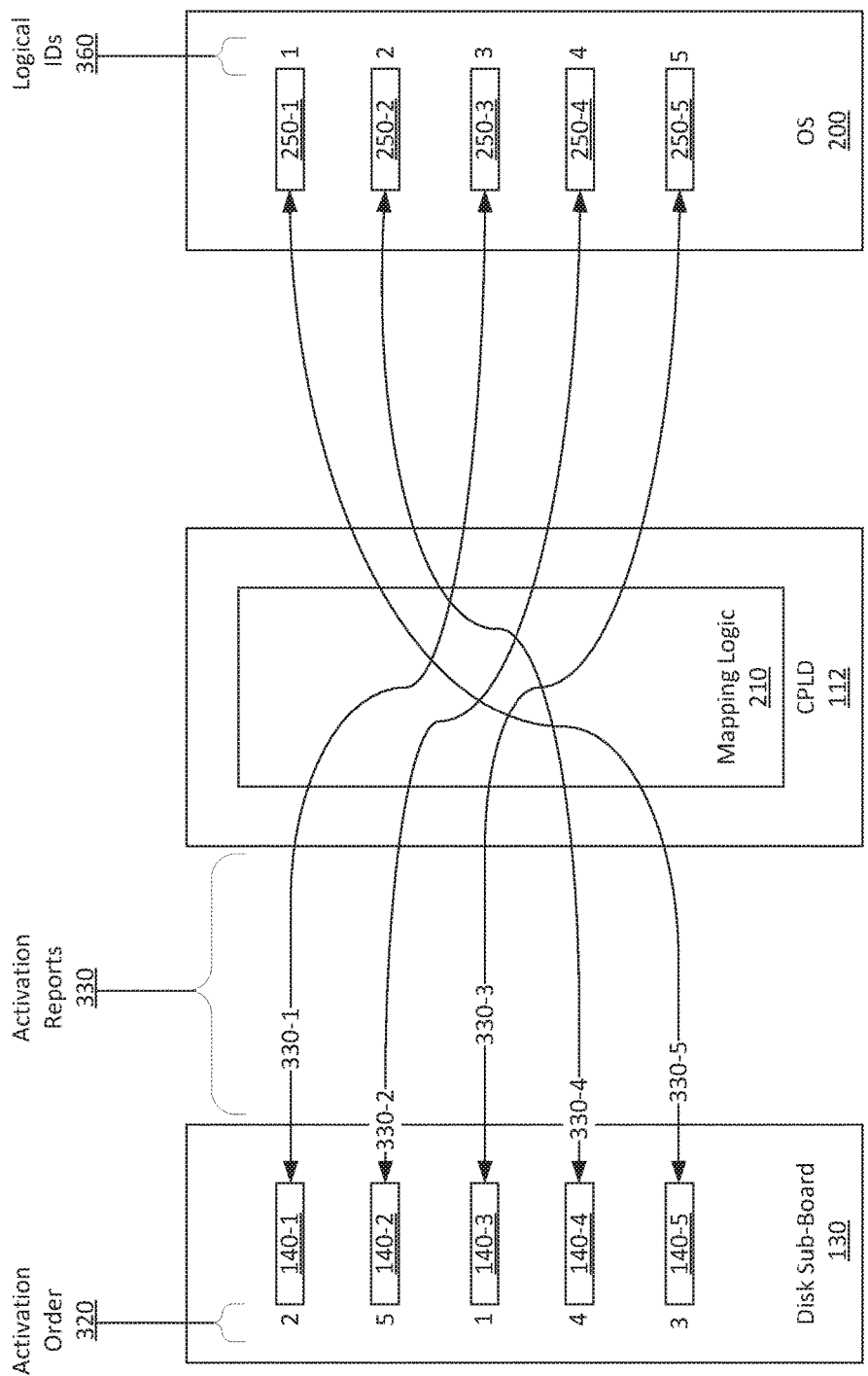
FIG. 3 is a conceptual illustration of how the reordering functionality is implemented by the mapping logic of FIG. 2, according to various embodiments of the present invention.

Persons skilled in the art will recognize that FIG. 2 is meant for illustrative purposes only, and not meant to limit the scope of the present invention. In general, mapping logic may perform any technically feasible reordering of activation reports in order to cause OS 200 to create a specific ordering of logical IDs 260. FIG. 3 sets forth one arbitrary reordering of activation responses 230.

FIG. 3 is a conceptual illustration of how the reordering functionality is implemented by the mapping logic of FIG. 2, according to various embodiments of the present invention. As shown, hard drives 140 become active according to activation order 320. In response to becoming active, each hard drive 140 transmits an activation report 330. Mapping logic 210 within CPLD 112 receives activation reports 330 in an order reflective of activation order 320. Mapping logic 210 may then perform any technically feasible reordering with activation reports 330, and then transmit those activation reports to OS 200. OS 200 then populates entries 350 with the received reports, or data reflective thereof, and assigns logical IDs 360 to the corresponding hard drives 140 in the order with which the corresponding activation reports 230 are received.

In one embodiment, mapping logic 210 performs a two-way mapping between bay numbers and logical IDs. For example, mapping logic 210 may acquire logical IDs 360 from OS 200, and then associate those logical IDs with specific hard drives 140 and/or specific bays where those hard drives are mounted. This functionality may be especially useful in situations where a particular hard drive 140 does not successfully activate. In such situations, OS 200 may skip the affected hard drive when assigning logical IDs 360, thereby causing subsequent logical ID assignments to no longer correspond to the bay numbers of the associated hard drives 140. To remedy this issue, mapping logic 210 maintains a two-way mapping, such as that shown, so that the bay number of a given hard drive can be determined based on the logical ID.

Figure 4:
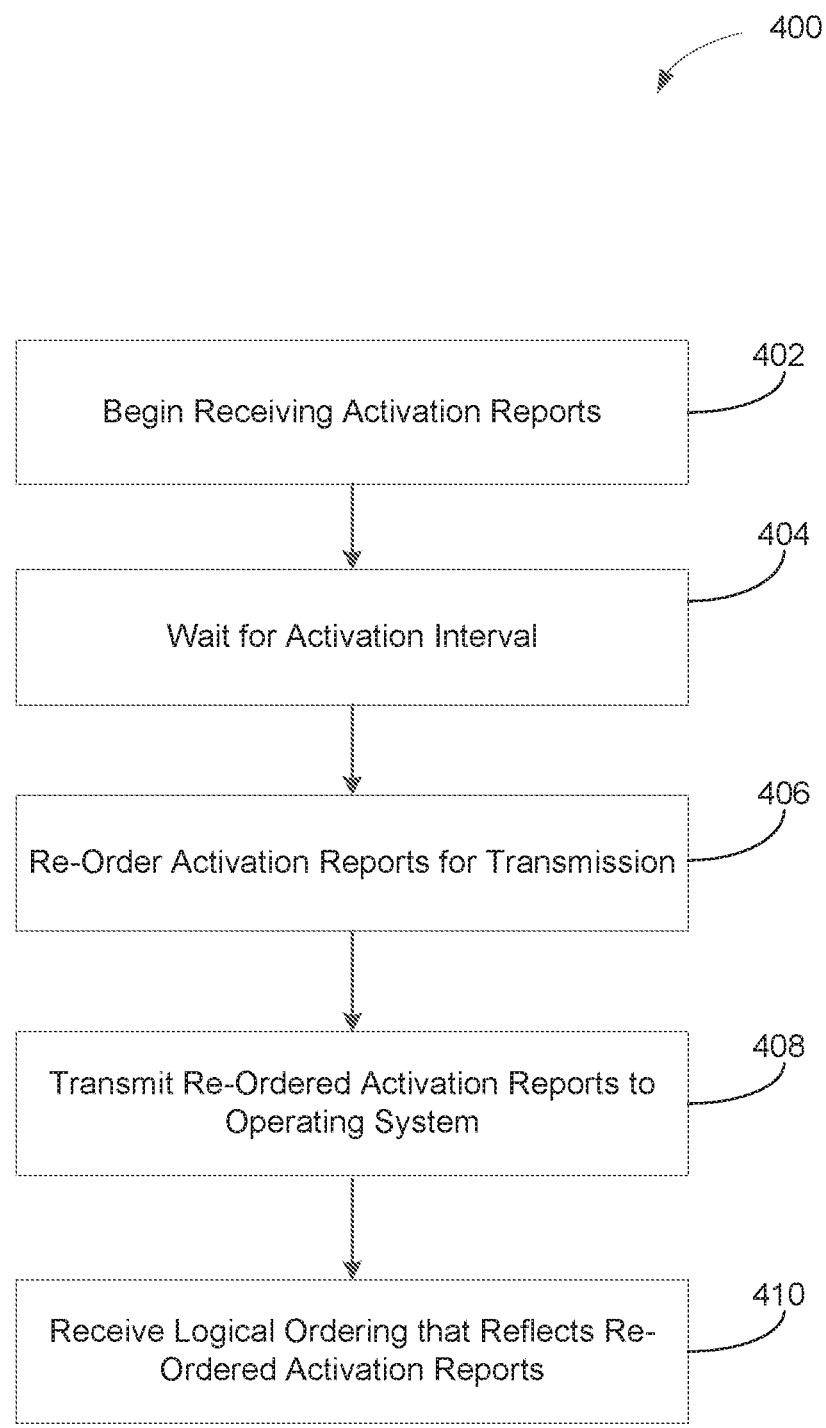
FIG. 4 is a flow diagram of method steps for re-ordering activation reports received from a plurality of hard drives, according to various embodiments of the present invention.

FIG. 4 is a flow diagram of method steps for re-ordering activation reports received from a plurality of hard drives, according to various embodiments of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where mapping logic 210 begins to receive activation reports from hard drives 140. Each such activation report typically includes a hard drive ID that identifies the hard drive responsible for sending the activation report. At step 404, mapping logic 210 waits for an activation interval. The activation interval generally reflects an amount of time typically needed for hard drives 140 to become active. The activation interval may be empirically determined, determined via simulation, or determined based on configurable parameters, among other possibilities.

At step 406, mapping logic 210 reorders the activation reports received at step 402 for transmission to the OS. Mapping logic 210 may reorder the responses in any technically feasible manner and according to any particular mapping. For example, mapping logic 210 could reorder the received activation reports to reflect the ordering of the bays where the hard drives 140 are mounted. At step 408, mapping logic 210 transmits the reordered activation reports to the OS. In response, the OS generates a series of logical ID assignments that corresponds to the ordering of activation reports implemented by mapping logic 210 at step 406.

In sum, a storage enclosure includes a plurality of hard drives coupled to a logic device that, in turn communicates with an operating system (OS) executing on a host computer system. When the storage enclosure is powered on, the hard drives become active at different times and transmit activation reports to the logic device in a random order. The logic device receives these activation reports, and then reorders then to align with the bay numbers where the hard drives are mounted. The logic device then transmits the reordered activation reports, and the OS assigns logical IDs to the hard drives that match the bay numbers.

One advantage of the approach described above is that the OS can provide an indication of a particular hard drive using a specific logical ID, and that logical ID can then be used to quickly locate the hard drive within the corresponding bay. Thus, if a hard drive needs to be repaired or replaced, a technician can very quickly identify that hard drive based on data received from the OS.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A storage enclosure, comprising:
   a first hard drive configured to transmit a first activation report to an operating system upon activation;
   a second hard drive configured to transmit a second activation report to the operating system upon activation; and
   a logic device configured to:
      receive the first activation report,
      receive the second activation report,
      reorder the first activation report and the second activation report according to a first order that is equivalent to an order of bays in a hard drive sub-board to which the first hard drive and the second hard drive are mounted; and
      transmit the first activation report and the second activation report to the operating system according to the first order.

2. The storage enclosure of claim 1, wherein the logic device is further configured to wait for an activation interval before transmitting any activation reports to the operating system.

3. The storage enclosure of claim 2, wherein the activation interval reflects an estimated amount of time for both the first hard drive and the second hard drive to become activated.

4. The storage enclosure of claim 1, wherein the first order indicates that the second activation report is to be transmitted to the operating system before the first activation report is transmitted to the operating system.

5. The storage enclosure of claim 1, wherein the first order further indicates that the second activation report is to be transmitted to the operating system after a third activation report associated with a third hard drive is transmitted to the operating system.

6. The storage enclosure of claim 1, wherein the first order further indicates that the second activation report is to be transmitted to the operating system before a third activation report associated with a third hard drive is transmitted to the operating system, and the first activation report is to be transmitted to the operating system after the third activation report is transmitted to the operating system.

7. The storage enclosure of claim 1, wherein the first order indicates that the first activation report is to be transmitted to the operating system before a third activation report associated with a third hard drive is transmitted to the operating system, and the second activation report is to be transmitted to the operating system after the third activation is transmitted to the operating system.

8. The storage enclosure of claim 1, wherein the bays in the hard drive sub-board comprise:
   a first bay that includes the second hard drive; and
   a second bay that includes the first hard drive,
   wherein the first bay and the second bay reside within the storage enclosure according to a second order.

9. The storage enclosure of claim 8, wherein the first order is the same as the second order.

10. The storage enclosure of claim 9, wherein the logic device is configured to transmit the first activation report and the second activation report to the operating system according to the first order to cause the operating system to assign logical identifiers to the first hard drive and to the second hard drive according to the second order.

11. A subsystem, comprising:
    a logic device coupled to a first hard drive and a second hard drive and configured to:
       receive a first activation report transmitted by the first hard drive upon activation,
       receive a second activation report transmitted by the second hard drive upon activation,
       reorder the first activation report and the second activation report according to a first order that is equivalent to an order of bays in a hard drive sub-board to which the first hard drive and the second hard drive are mounted; and
       transmit the first activation report and the second activation report to an operating system according to the first order.

12. The subsystem of claim 11, wherein the logic device is further configured to wait for an activation interval before transmitting any activation reports to the operating system, and wherein the activation interval reflects an estimated amount of time for both the first hard drive and the second hard drive to become activated.

13. The subsystem of claim 11, wherein the first order indicates that the second activation report is to be transmitted to the operating system before the first activation report is transmitted to the operating system.

14. The subsystem of claim 11, wherein the first order further indicates that the second activation report is to be transmitted to the operating system after a third activation report associated with a third hard drive is transmitted to the operating system.

15. The subsystem of claim 11, wherein the first order further indicates that the second activation report is to be transmitted to the operating system before a third activation report associated with a third hard drive is transmitted to the operating system, and the first activation report is to be transmitted to the operating system after the third activation report is transmitted to the operating system.

16. The subsystem of claim 11, wherein the first order indicates that the first activation report is to be transmitted to the operating system before a third activation report associated with a third hard drive is transmitted to the operating system, and the second activation report is to be transmitted to the operating system after the third activation is transmitted to the operating system.

17. The subsystem of claim 11, wherein the bays in the hard drive sub-board comprises:
    a first bay that includes the second hard drive; and
    a second bay that includes the first hard drive,
    wherein the first bay and the second bay reside within the storage enclosure according to a second order.

18. The subsystem of claim 17, wherein the first order is the same as the second order, and wherein the logic device is configured to transmit the first activation report and the second activation report to the operating system according to the first order to cause the operating system to assign logical identifiers to the first hard drive and to the second hard drive according to the second order.

19. A computer-implemented method for re-ordering activation reports, the method comprising:
receiving a first activation report transmitted by a first hard drive upon activation;
receiving a second activation report transmitted by a second hard drive upon activation;
reorder the first activation report and the second activation report according to a first order that is equivalent to an order of bays in a hard drive sub-board to which the first hard drive and the second hard drive are mounted; and
transmitting the first activation report and the second activation report to an operating system according to the first order.

20. The computer-implemented method of claim 19, wherein the first order reflects a physical placement of the first hard drive and the second hard drive within a storage enclosure, and wherein the logic device is configured to transmit the first activation report and the second activation report to the operating system according to the first order to cause the operating system to assign logical identifiers to the first hard drive and to the second hard drive according to the first order.

* * * * *